United States Patent Office 3,332,772
Patented July 25, 1967

---

3,332,772
PURIFICATION OF MOLTEN FERROUS BASE METALS
Jerome J. Kanter, Palos Park, Ill., assignor to Crane Company, Chicago, Ill., a corporation of Illinois
No Drawing. Filed June 30, 1965, Ser. No. 468,569
13 Claims. (Cl. 75—130)

This application is a continuation-in-part of application Ser. No. 277,995, filed Oct. 3, 1962 and now abandoned, by Jerome J. Kanter and assigned to the same assignee.

The present invention relates to the purification of ferrous melts with iron chloride, and more particularly to the preparation of molten cast iron by removal of undesirable cationic contaminants.

Although the present invention may be used in a wide variety of ways, it is particularly useful in connection wit hthe preparation of nodular iron. In the nodular iron processes the physical characteristics of cast iron are improved by forming the graphite in compacted, spheriodal, or nodular shapes. Nodular graphite in the as cast product is obtained by the addition to the molten cast iron melt certain nodularizing agents, such as magnesium, yttrium, or cerium.

The cast iron melt for making nodular iron is usually prepared from scrap iron, which may additionally contain reactive metal or cationic elements, for example, aluminum, titanium, chromium, manganese, tin, and lead, all of which are subversive to the formation of spherulite carbon. Various other contaminants are also found in differing amounts in cast iron. In some of these contaminants anionic elements are also present in metal compounds, for example, as compounds of one or more of the foregoing metals.

The difficulties encountered heretofore in the preparation of nodular iron on a commercial scale may be attributable in many instances to the presence of undesirable cationic contaminants in the cast iron melt. For example, magnesium, which at the present time is the most widely used nodularizing agent, it is very reactive and tends to dissipate itself by reactions with contaminants in advance of any nodularizing effect. It is difficult to predict the amount of magnesium needed for a nodularizing addition because of the reactions which take place between magnesium and the various contaminants. Many difficulties are resolved if the contaminants are first eliminated.

It will be apparent that any steps which are taken toward purifying the melt prior to the addition of the nodularizing agent, will improve the uniformity of the product, and result in greater control and less scrap. The theoretical ideal has not been attainable heretofore on a practical, economically feasible, commercial scale.

Jordan Patent No. 2,530,368 discloses the introduction to an iron melt of ferric chloride by gaseous carrier to remove magnesium. The ferric chloride is highly volatile having a boiling point of 315° C. and substantially below the melting point of eutectic iron carbon solution which creates difficulties in its introduction to the melt and reduces the efficiency of the purification process. The requirements of a gaseous carrier for introducing ferric chloride into a melt has definite disadvantages in foundry practices because of the special equipment required, expense, and the lack of flexibility of the process.

In addition to preconditioning iron to improve its response to the formation of spherulite graphite there are many other manufacturing techniques and processes which desirably could utilize purification from various contaminants. Many processes which do not contemplate producing nodular iron would be improved by purification from contaminants, including the cationic elements of aluminum, titanium, chromium, manganese, tin, or lead.

The principal object of the present invention is to provide for the removal of undesirable contaminants from various products. It is a further object of the invention to remove undesirable contaminants from cast iron melts preparatory to nodularization. Still another object of the invention is to provide an effective addition material for purifying ferrous melts that is more economical than previously used agents. It is still another object of the invention to provide a process for improving the physical properties of cast iron. It is yet another object of the invention to provide a process for purifying ferrous metal that does not require special equipment. Other objects and advantages of the present invention will become apparent to those skilled in this field from a study of the following description.

Briefly stated, the invention is directed to a process for purifying cast iron which comprises the steps of preparing a ferrous base metal melt which contains undesirable contaminants and treating said molten ferrous base metal melt with ferrous chloride in order to remove at least a portion of the undesirable contaminants.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principal of the invention may be employed.

In the preparation of a melt to form as cast spherulite, graphite, the starting composition of the melt will be cast iron, either gray iron or white iron. Carbon and silicon will be present in the cast iron range, for example, 2%–5% by weight of carbon and 1%–5% by weight of silicon. In the preparation of melts for other uses, the composition may be ferrous base metals containing at least 50% by weight of iron and usually at least 90% by weight of iron.

The starting composition for treatment may contain various contaminants for removal thereof according to the present invention, for example, certain cationic elements, such as aluminum, titanium, chrotmium, manganese, tin, or lead. In addition, the cationic elements normally will be associated with various anioic elements, such as compounds of sulphur, nitrogen, oxygen, and the like.

As a feature of the invention, ferrous chloride is introduced into the molten melt as a solid charge. In the preferred process ferrous chloride is introduced into the melt in the form of a solid block, or brick. The block may be made of iron or steel pieces impregnated with ferrous chloride.

The solid ferrous chloride containing charge may be made in various forms, for example, in one form iron turnings may be loosely compressed in a briquette which is impregnated with ferrous chloride. In another form, iron turnings are introduced loosely into a plastic container which is then filled with ferrous chloride.

Since ferrous chloride has a specific gravity of about 3, while molten iron has a specific gravity of about 6.9, it is desirable that the ferrous chloride containing solid charge at least approach the molten iron specific gravity, so that the charge may be readily submerged. An iron briquette of 80% density, for example, has a specific gravity of 7.2 which, when impregnated with ferrous chloride will have a final specific gravity above 3, and desirably a specific gravity above about 6.

The amounts of ferrous chloride employed are at least sufficient for the chlorine to react with the undesirable cationic elements. For example, if the total weight of the cationic elements be 0.5% by weight, about one pound of chlorine per 100 pounds of charge will be needed. Excess amounts of ferrous chloride have no adverse effects if properly handled, since the unreacted ferrous chloride is volatilized and is normally removed through the stack. In order to further illustrate the invention, the following examples are given which are not intended to limit the scope of the invention.

*Example I*

An additive block containing ferrous chloride was prepared by loosely briquetting cast iron boring pieces in a mounting press into a slug weighing about 24 grams, approximately one inch in length and one-half inch in depth. Ferrous chloride was melted in a beaker over a flame allowing the water of hydration to boil away until the ferric chloride sublimate appeared. Upon cooling, the boring pieces were cemented together in a brick and the 24 gram slug had increased in weight to 31 grams. The ferric chloride had been converted by heating in the presence of iron to ferrous chloride.

*Example II*

The ferrous chloride containing block prepared by Example I was added to a cast iron melt containing cationic elements. After the addition the melt was poured into a mold and cooled. Upon examination of the casting, it was determined that the cationic element had been removed.

The reaction of ferrous chloride with cationic elements is exothermic. The heat of reaction is desirable, since it provides additional heat to bring the reactent to molten temperatures.

Following treatment with ferrous chloride as described hereinabove, the cast iron melt may be then treated with a nodularizing agent to form spherulite graphic. The various nodularizing agents of the prior art may be used, for example, it may be desirable to add magnesium in accordance with the disclosure of the Millis Patent No. 2,485,760, yttrium in accordance with the Kanter et al. Patent No. 3,055,756, or cerium in accordance with Morrogh Patents Nos. 2,488,511 and 2,488,513.

Although the purification process of the invention is useful for other purposes, it provides unique advantages for the preparation of nodular iron. The purification process of the invention removes the cationic elements which usually interfere with the nodularizing agents. The cationic contaminant has a greater free energy of formation of chlorides than the free energy of formation of ferrous chloride and less than the free energy of formation of magnesium chloride. This means that the ferrous chloride will first react in the melt with magnesium, if any is present, and after the reaction with magnesium then with the cationic elements. The ferrous chloride charge should be sufficient to remove the cationic elements, after the magnesium has reacted.

One of the advantages of the invention is the use of a solid charge. This makes the process convenient for use in the foundry. Another advantage of the invention is removal of the undesirable contaminants by their volatilization as chlorides, instead of forming dross. Still another advantage is the convenient economical manner in which the purification is accomplished.

Other modes of applying the principle of the invention may be employed, change being made as regards the details described, provided the features state in any of the following claims or the equivalent of such be employed.

I, therefore, particularly point out and distinctly claim as my invention:

1. In the process for producing nodular graphite cast iron by treatment of molten cast iron with nodularizing agents, the method of purifying the molten cast iron of undersirable cationic elements including aluminum, titanium, manganese, chromium, tin and lead preparatory to the nodularizing step, which comprises: preparing a cast iron melt containing at least one undesirable cationic contaminant, said cationic contaminant having a free energy of formation of a chloride greater than ferrous chloride and less than magnesium chloride, and treating said molten cast iron melt by introducing a solid charge containing sufficient ferrous chloride to react with said undesirable contaminants.

2. The process of claim 1 in which said solid charge has a density above 3.

3. The process of claim 1 in which said solid charge is in the form of a solid block.

4. The process of claim 1 in which said solid charge comprises a ferrous base metal carrier and ferrous chloride.

5. The process of claim 1 in which said solid charge comprises ferrous base metal pieces and ferrous chloride.

6. In the method of purifying the molten cast iron of undersirable cationic elements including aluminum, titantium, manganese, chromium, tin, and lead, the steps which comprise: preparing a cast iron melt which contains at least one undesirable cationic contaminant, said cationic contaminant having a free energy of formation of a chloride greater than ferrous chloride and less than magnesium chloride, introducing into said molten cast iron melt a solid charge containing sufficient ferrous chloride to react with and form gaseous chlorides of said cationic contaminant, and removing said gaseous chlorides of the cationic contaminant.

7. The process of claim 6 in which said solid charge is in the form of a solid block.

8. The process of claim 6 in which said solid charge comprises ferrous chloride and a ferrous base metal carrier.

9. The process of claim 6 in which said solid charge comprises ferrous base metal pieces and ferrous chloride.

10. In the process for producing nodular graphite cast iron by treatment of molten cast iron with nodularizing agents, the method of purifying the molten cast iron of undersirable cationic elements including aluminum, titanium, maganese, chromium, tin and lead preparatory to the nodularizing step, which comprises: preparing a cast iron melt containing at least one undesirable cationic contaminant, said cationic contaminant having a free energy of formation of a chloride greater than ferrous chloride and less than magnesium chloride, and treating said molten cast iron melt by introducing a solid charge containing sufficient ferrous chloride to react with said undesirable contaminant after reacting with cationic elements that may be present in the melt having a free energy of formation of magnesium chloride and greater.

11. The process of claim 10 in which said solid charge has a density above 3.

12. The process of claim 10 in which said solid charge is in the form of a solid block.

13. The process of claim 10 in which said solid charge comprises a ferrous base metal carrier and ferrous chloride.

References Cited

UNITED STATES PATENTS

| | | | |
|---|---|---|---|
| 1,555,978 | 10/1925 | Hunt | 75—53 X |
| 2,134,905 | 11/1938 | Bampfylde | 75—130 X |
| 2,530,368 | 11/1950 | Jordan | 75—130 X |
| 2,881,068 | 4/1959 | Bergh | 75—53 |
| 2,988,444 | 6/1961 | Hurum | 75—130 X |

FOREIGN PATENTS 2,390    1860    Great Britain.

OTHER REFERENCES

Perry: Chemical Engineers' Handbook, McGraw-Hill, 3d ed., 1950, page 151.

HYLAND BIZOT, *Primary Examiner.*

DAVID L. RECK, *Examiner.*

H. W. TARRING, *Assistant Examiner.*